United States Patent [19]
Szlaga et al.

[11] Patent Number: 5,950,659
[45] Date of Patent: Sep. 14, 1999

[54] VEHICLE FUEL VAPOR VENT VALVE

[75] Inventors: Emil Szlaga, Sterling Heights; Darrin Hurley, Brownstown, both of Mich.

[73] Assignee: Saturn Electronics & Engineering, Inc., Auburn Hills, Mich.

[21] Appl. No.: 09/116,180

[22] Filed: Jul. 15, 1998

[51] Int. Cl.⁶ ................................................. F16K 24/04
[52] U.S. Cl. ............................................ 137/202; 137/43
[58] Field of Search ....................................... 137/43, 202

[56] References Cited

U.S. PATENT DOCUMENTS

| | | |
|---|---|---|
| 2,276,136 | 3/1942 | Woolley . |
| 3,180,345 | 4/1965 | Klank, Jr. . |
| 3,202,199 | 8/1965 | Wood . |
| 3,242,937 | 3/1966 | Morin . |
| 3,334,645 | 8/1967 | Weinstein . |
| 3,351,497 | 11/1967 | Lucas . |
| 3,568,695 | 3/1971 | DeFrees . |
| 3,586,032 | 6/1971 | Weinstein . |
| 3,796,227 | 3/1974 | Fujiwara . |
| 4,423,746 | 1/1984 | Scheurenbrand et al. . |
| 4,753,262 | 6/1988 | Bergsma . |
| 4,886,089 | 12/1989 | Gabrlik et al. . |
| 5,028,244 | 7/1991 | Szlaga . |
| 5,044,389 | 9/1991 | Gimby . |
| 5,313,977 | 5/1994 | Bergsma et al. . |
| 5,439,023 | 8/1995 | Horikawa . |
| 5,592,963 | 1/1997 | Bucci et al. . |

*Primary Examiner*—Gerald A. Michalsky

[57] ABSTRACT

A fuel vapor vent valve assembly for a vehicle fuel tank for venting fuel vapor from the fuel tank to a fuel vapor emission device disposed external of the fuel tank, wherein the assembly comprises a valve housing having a fuel vapor vent outlet opening or orifice defined by a valve seat and communicating with a fuel tank vapor space interior of the fuel tank and with a fuel vapor emission device, such as a charcoal canister, exterior of the fuel tank. A fuel level responsive valve-moving device, such as a float, is disposed in the housing for movement therein. A vapor vent valve is disposed on the device in a manner for closing and opening the vent orifice in response to the fuel level in the fuel tank. The vent valve includes a partial spherical, radius-defined sealing surface that mates with a sealing surface of the valve seat to provide liquid/vapor tight sealing relation therebetween when the valve is in the closed position relative to the valve seat. The vent valve includes an axle about which the valve surface is rotated relative to the valve seat surface in response to initial downward movement of the valve-moving device when the valve and valve seat surfaces are in sealing relation. The valve surface is configured such that a small degree of rotation of the valve relative to the valve seat interrupts or breaks the sealing relation therebetween, providing a vapor flow path that reduces the pressure differential across the valve to facilitate its reopening by further downward movement of the valve-moving device.

15 Claims, 7 Drawing Sheets

VEHICLE FUEL VAPOR VENT VALVE

FIELD OF THE INVENTION

The present invention relates to a fuel vapor vent valve assembly for a vehicle fuel tank and, more particularly, to a fuel vapor vent valve assembly that includes a rotate-in-seat vent valve feature that facilitates valve reopening after closure.

BACKGROUND OF THE INVENTION

The vapor vent valve assembly provided on current automotive fuel tanks typically has a fixed fuel vapor vent orifice to provide a flow passage from the fuel tank vapor space or dome to an emission apparatus, such as a charcoal canister, located external of the fuel tank. Fuel vapor vent valve assemblies typically are designed with a mechanism to close the fuel vapor vent orifice in the presence of liquid fuel, such as may occur at high static fuel levels in the fuel tank and from sloshing fuel in the fuel tank during vehicle movement. Closure of the fuel vapor vent orifice typically in the presence of liquid fuel at the valve assembly has been effected by a float biased with a spring load as required to achieve a buoyant force responsive to both static and dynamic fuel level changes. For instance, the float can have its upper region configured to include a nipple that is seated against the vent orifice to provide a liquid/vapor tight closure of the fuel vapor flow passage leading from the vent orifice to the charcoal canister.

During dynamic fuel sloshing conditions occurring during vehicle maneuvers, the float nipple seats against the entrance to the vent orifice when the fuel level is above the float buoyant point and is supposed to unseat when fuel level is below the buoyant point. However, a functional problem has been encountered with respect to valve unseating when the vent orifice is closed during high fuel levels that cause increased fuel tank vapor pressure and an increased pressure differential across the closed valve/vent orifice. In particular, the downward force required to reopen the fuel vapor vent valve is defined by and limited to the effective weight of the float (actual weight minus spring load and, if any, liquid buoyancy force). Therefore, it is possible that the effective weight of the float may be insufficient to counteract the vent orifice closure force resulting from the tank vapor pressure multiplied by the orifice sealing area. This adverse float weight condition has occurred when the vent orifice is designed to be large to accommodate high fuel vapor flow rates to minimize tank pressures pursuant to vehicle manufacturer requirements and the overall vent valve assembly size is insufficient to permit use of a float with a weight as required to reopen a closed (sealed) vent orifice at a specified level of fuel tank pressure due to vehicle manufacturer packaging envelop/space constraints on the fuel tank.

An object of the present invention is to provide a vapor vent valve assembly for a vehicle fuel tank that overcomes this problem of valve reopening.

Still another object of the present invention is to provide a vapor vent valve assembly for a vehicle fuel tank that overcomes this problem of valve reopening as exacerbated by high fuel vapor flow rate requirements and by limited packaging envelop/space constraints on the fuel vapor vent valve assembly.

A further object of the present invention is to provide a vapor vent valve assembly for a vehicle fuel tank that overcomes this problem of valve reopening by virtue of including a rotate-in-seat vent valve mechanism.

SUMMARY OF THE INVENTION

The present invention provides a fuel vapor vent valve assembly comprising a valve housing having a fuel vapor vent outlet opening or orifice communicating with a fuel tank vapor space interior of the fuel tank and with a fuel vapor emission device, such as a charcoal canister, exterior of the fuel tank. A fuel level responsive valve-moving device, such as a float, is disposed in the housing for movement therein. A vapor vent valve is disposed on the device in a manner for closing and opening a valve seat associated with the vent orifice in response to the fuel level in the fuel tank. The vent valve includes a partial spherical, radius-defined sealing surface that mates with a sealing surface of the valve seat, preferably in line contact, to provide liquid/vapor tight sealing relation therebetween when the valve is in the closed position relative to the valve seat. The vent valve includes a shaft or axle about which the vent valve is rotated in the valve seat to rotate the valve sealing surface relative to the valve seat sealing surface in response to initial downward movement of the valve-moving device when the sealing surfaces are in liquid/vapor tight sealing relation. The valve surface is configured such that a small degree of rotation of the valve relative to the valve seat interrupts or breaks the sealing relation between the sealing surfaces to provide a vapor flow path that reduces the pressure differential across the vent valve to facilitate its reopening by further downward movement of the valve-moving device.

In an illustrative embodiment of the invention, the valve sealing surface and line of contact between the valve and valve seat sealing surfaces are defined by a common center of their radii when the valve and valve seat are in liquid/vapor tight sealing relation. In this relation, the fuel vapor vent valve is rotatable in response to movement of the valve-moving device relative to the valve seat about an axis defined by the valve axle which resides in a diametral plane of the partial spherical valve sealing surface and substantially intersects the common center. The valve surface comprises an annular, partial spherical surface about a circumference of a vent valve head. The valve surface is bounded between upper and lower circular lips having adjoining surfaces that are configured to provide a vapor flow path when the valve is rotated relative to the valve seat by the downward movement of a float. The valve seat sealing surface can be a conical, radiused, partially spherical or other sealing surface that preferably provides line of contact sealing with the partially spherical sealing surface of the vent valve to provide low static friction therebetween.

In a particular illustrative embodiment of the invention, the shaft or axle of the vapor vent valve includes ends that reside in respective axial slots extending upwardly on a float. The slots include selected width dimensions that maintain the longitudinal axis of the axle of the valve in proper position relative to the diametral plane and the center of the valve sealing surface. The upper ends of the slots apply a downward load or force on the shaft or axle after sealing relation between the valve and valve seat sealing surfaces is broken. The vapor vent valve further includes an arm that extends radially from the shaft or axle and is engaged by an overlying arm of the float as it moves downwardly to initially rotate the vapor vent valve about the axle to break the liquid/vapor tight sealing relation between the valve and valve seat sealing surfaces and reduce the vapor pressure differential across the vent valve. Subsequently, the float via its upwardly extending slots applies a downward force on the vapor vent valve to move it axially away from the valve seat to open the vent orifice.

The present invention is advantageous to provide a vapor vent valve assembly for a vehicle fuel tank that overcomes the problem of valve reopening that can occur by the need for a large vapor vent orifice for high vapor flow rates and by limited packaging envelop/space constraints on the fuel vapor vent valve assembly.

The present invention will be better understood from the following detailed description taken with the following drawings.

DESCRIPTION OF THE INVENTION

Figure 1:
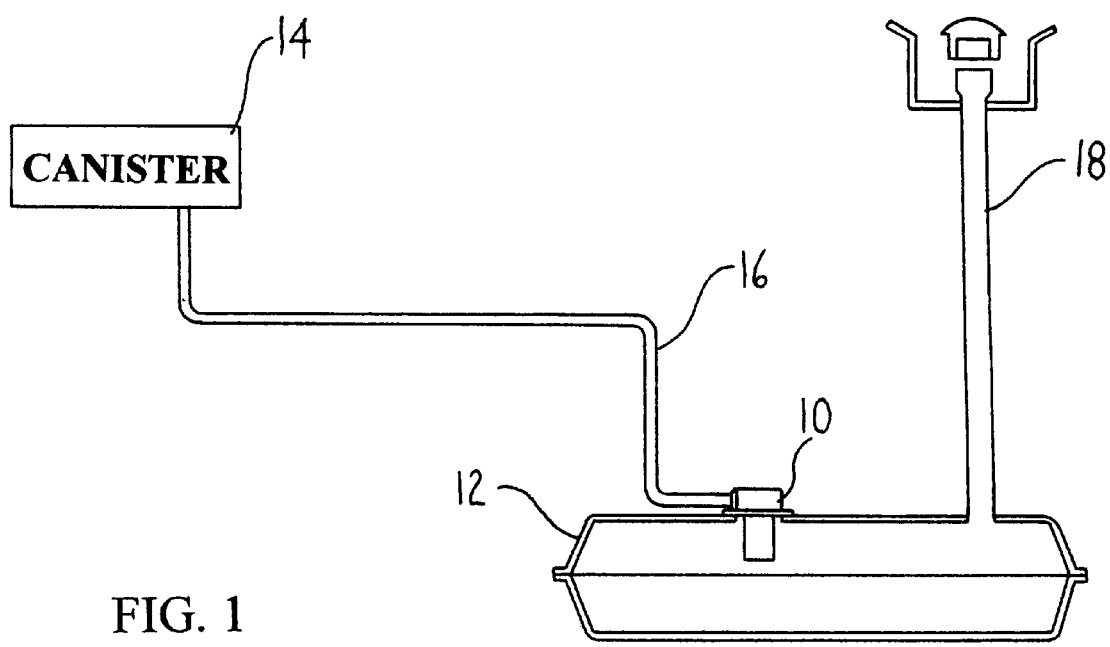
FIG. 1 is a schematic view of a vehicle fuel tank and related fuel system components showing a fuel vapor vent valve assembly pursuant to an embodiment of the invention positioned on the top of the tank.

The present invention provides a fuel vapor vent valve assembly 10 for a vehicle fuel system and, in particular, for venting fuel vapors from a conventional vehicle fuel tank 12, FIG. 1, in controlled manner to an emission device, such as a carbon canister 14, located external of the fuel tank via a conduit 16. The fuel tank 12 includes a conventional fuel fill pipe 18 connected thereto by which fuel is introduced into the tank.

The fuel vapor vent valve assembly 10 functions to vent fuel vapor from the fuel tank 12 when the fuel level therein is below a certain level that typically corresponds to 100% rated tank capacity. When the fuel level in the tank is above that level either in a static situation (e.g. high fuel level in the tank after filling the tank) or a dynamic situation (e.g. fuel sloshing in the tank or accidental vehicle rollover or severe vehicle tilt), the fuel vapor vent valve assembly 10 closes and functions to prevent liquid fuel from exiting the fuel tank and flowing into the canister 14.

As mentioned above, during fuel sloshing conditions occurring during vehicle maneuvers, prior fuel vent valve assemblies have experienced a functional problem where the vent valve may not reopen as a result of insufficient float weight especially when the valve assembly is designed to accommodate high fuel vapor flow rates pursuant to vehicle manufacturer requirements and overall vent valve assembly size is restricted due to vehicle manufacturer packaging envelop/space constraints. The present invention provides a vapor vent valve assembly for a vehicle fuel tank that addresses and overcomes this problem of valve reopening by virtue of including a novel rotate-in-seat vent valve mechanism.

Referring to FIGS. 2–5, a fuel vapor vent valve assembly 10 pursuant to an illustrative embodiment of the invention is shown.

The fuel vapor vent valve assembly 10 comprises a tubular valve housing 20 having a peripheral lateral circumferential flange 20a that is attached to the wall W of the fuel tank 12 by mechanical connection, such as a grommet seal (not shown), adhesive, plastic welding, or other conventional attachment techniques. The housing 20 preferably is made of a fuel resistant plastic material such as, but not limited to, acetal resin, although metal or other materials may be used to this end.

The housing 20 defines a float chamber 21 therein proximate the lower region thereof located inside the fuel tank 12. A fuel vapor vent opening 22 is defined in an upper region of the housing 20. The vent opening 22 communicates to a lateral conduit 23 that is communicated to the canister 14 via conduit 16. The conduit 23 typically is molded integrally with the housing 20 although the invention is not so limited.

A valve seat-forming member 30 is disposed in the upper region of the housing 20 and forms a vent passage 30a communicating with the vent opening 22 and having a constricted passage section 30b whose cross-sectional size is selected to control flow rate of fuel vapors through the valve assembly. Vent valve seat 32 is formed on the member 30 and is described in further detail below. The valve seat-forming member 30 is fastened to the housing 20 by conventional plastic welding techniques or may be molded integrally therewith.

The housing 20 includes one or more fuel vapor vent openings 20o in the upstanding cylindrical skirt or sidewall 20w thereof to communicate to the vapor space or dome of the fuel tank 12 to permit fuel vapor to enter the housing. Disposed in the housing float chamber 21 is a fuel level responsive float (valve-moving device) 35 that is freely movable up/down as the fuel level rises/falls in the fuel tank 12. To this end, the float chamber 21 communicates to liquid fuel in the fuel tank via openings 20p in the lower end of cylindrical sidewall and/or in the retainer 37. The housing 20 includes an inner wall 20i having a plurality of molded radially extending and circumferentially spaced apart (e.g. 45 degrees apart) guide ribs 39 extending axially along the housing for positioning the float 35 away from the inner wall thereof. The inner wall of the housing 20 has a slight outward taper from top toward the bottom as required by the molding operation for core removal. The ribs 39 extend radially from the inner housing wall such that the inner rib surfaces collectively define the cylindrical float chamber 21 in the housing 20. The opening(s) 20o for fuel vapor communicate with the interior of the housing 20 between the ribs 39.

The float 35 is made of fuel resistant material such as plastic material mentioned above for the housing 20 with the material having density equal to or greater than that of the liquid fuel in the fuel tank. The float 35 includes a generally cylindrical sidewall and is biased in an upward direction by a coil spring 36 positioned between an apertured bottom housing spring retainer 37 snap fit on the housing 20 and an recessed upper internal wall 35a of the float as shown. The spring 36 typically biases the float 35 upwardly enough to make it buoyant when submerged in the liquid fuel in the float chamber 21, although the invention is not so limited and can be practiced so long as the spring renders the float buoyant in the liquid fuel and is effective to close the vent valve assembly 10 in severe vehicle tilt situation or as assisted by gravity in a vehicle rollover situation.

A vapor vent valve 42 is disposed on the top of the float 35 in a manner for closing and opening the vent valve seat 32 in response to the fuel level in the fuel tank 12. The vent valve 42 includes an upper valve head having a partial spherical, radius-defined sealing surface 42a that mates with the sealing surface 32a of the vent valve seat 32 to provide liquid/vapor tight sealing relation therebetween when the valve 42 is in the closed position relative to the valve seat 32. In one embodiment shown, the valve seat sealing surface 32a has a frusto-conical configuration to provide a circumferential line of contact sealing with the valve sealing surface 42a to maintain low friction therebetween when the sealing surfaces 32a, 42a are in sealing relation. The valve seat sealing surface 32a is not limited to any particular configuration and may have a radiused or other edge shape or any other configuration to provide circumferential line of contact sealing with the valve sealing surface 42a. The sealing surface 32a also may have a partial spherical configuration complementary to that of valve sealing surface 42a, although this may increase friction between the sealing surfaces 32a, 42a.

The vent valve 42 includes a cylindrical shaft or axle 44 about which the valve 42 and thus valve surface 42a is rotated relative to the valve seat surface 32a in response to initial downward movement of the float 35 when the valve and valve seat surfaces 42a, 32a are in sealing relation as explained below. The valve sealing surface 42a is configured such that a small degree of rotation of the valve 42 in the valve seat 32 interrupts or breaks the sealing relation between sealing surfaces 42a, 32a, providing a vapor flow path that reduces the vapor pressure differential across the valve 42 to facilitate its reopening by further downward movement of the float 35.

Figure 5:
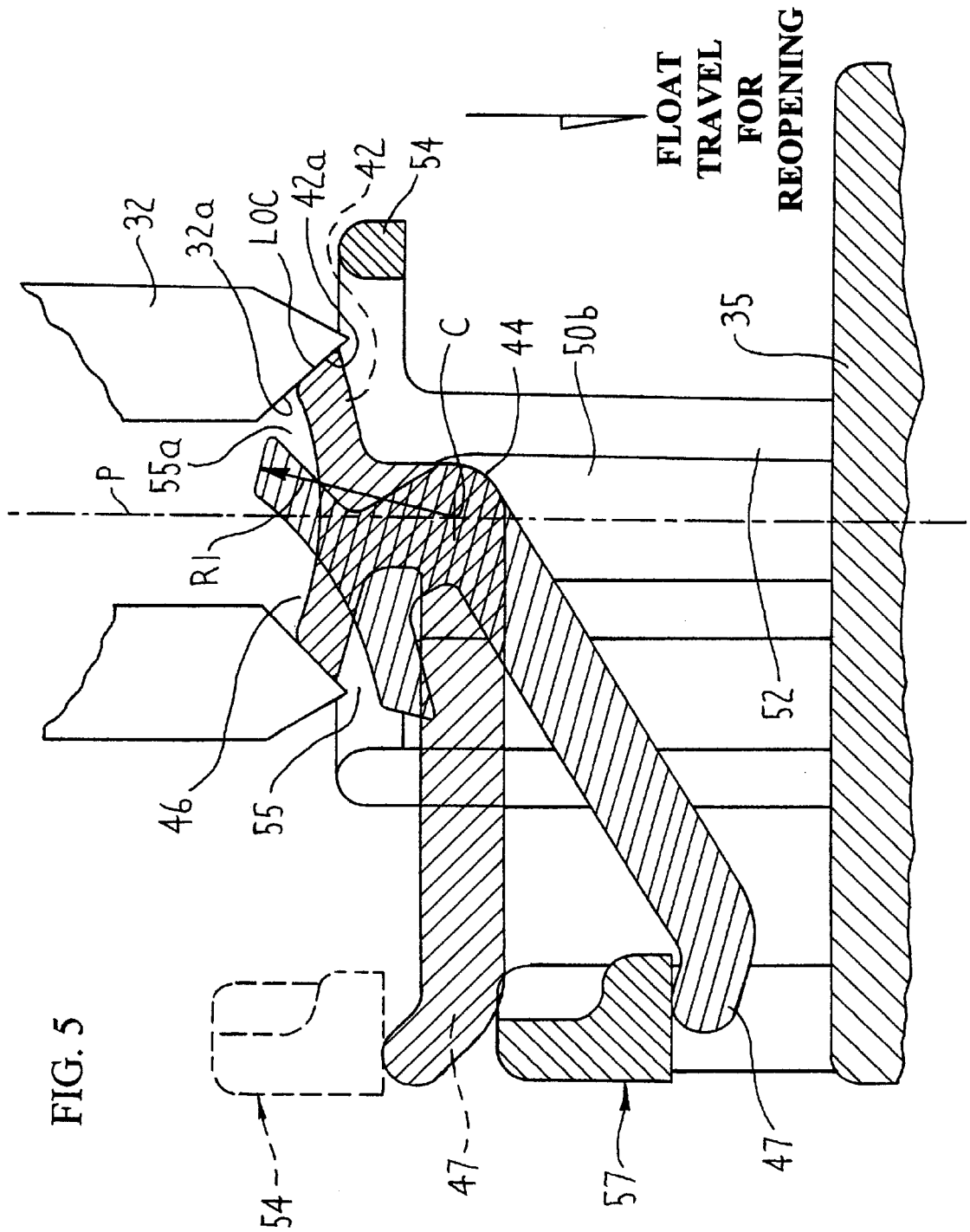
FIG. 5 is a partial sectional view of the vent valve and valve seat showing the center of the partial spherical, radius-defined valve sealing surface.
Figure 5A:
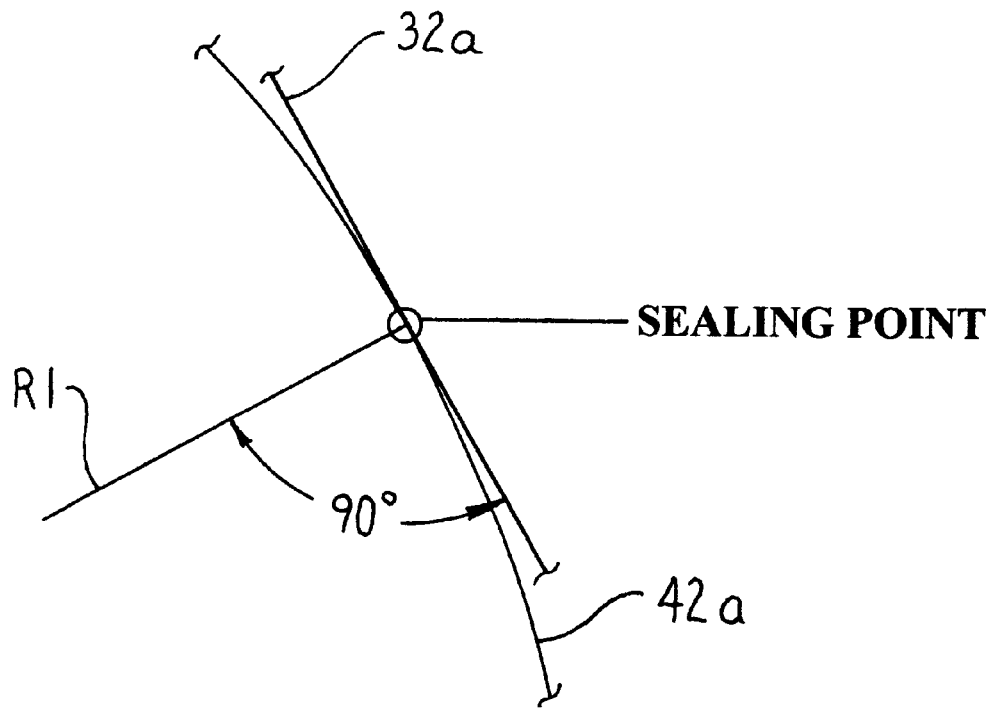
FIGS. 5A and 5B are enlarged schematic diagrams of the vent valve sealing surface and valve seat sealing surface, FIG. 5A showing sealing contact between the partial spherical valve sealing surface and the conical valve seat sealing surface and FIG. 5B showing sealing contact between the partial spherical valve sealing surface and a radiused valve seat sealing surface pursuant to another embodiment of the invention.

As shown best in FIG. 5, the valve sealing surface 42a is defined by a center C having radius R1 and the circumferential line of contact LOC between the sealing surfaces 32a, 42a has essentially the same radius R1 when the valve and valve seat 42, 23 are in liquid/vapor tight sealing closed relation. The spherical radius R1 is perpendicular to the conical sealing surface 32a at the line of contact therebetween as shown best in FIG. 5A, which is a schematic diagram of the sealing relation between surfaces 32a, 42a. The shaft or axle 44 of the vent valve 42 defines a longitudinal axis A that resides in a diametral plane P of the partial spherical sealing surface 42a and in the longitudinal axis of cone-shaped surface 32a and substantially intersects the center C of the radius R1 such that the valve 42 is rotatable in the valve seat 32 about axis A defined by the axle 44. The shaft or axle 44 is located below the valve sealing surface 42a as a result of the location of the center C of the radii R1 of sealing surface 42a. The shaft or axle 44 is connected to the valve sealing surface 42a via an integrally molded neck 45.

The valve sealing surface 42a is shown as an annular, partial spherical surface extending about the circumference of the valve head 42h. The valve surface 42a is bounded between upper and lower circular lips 42b and 42c by having adjoining surfaces configured to provide a vapor flow path when the valve 42 is rotated in the valve seat 32 by a small degree of rotation which is valve geometry dependent.

Figure 5B:
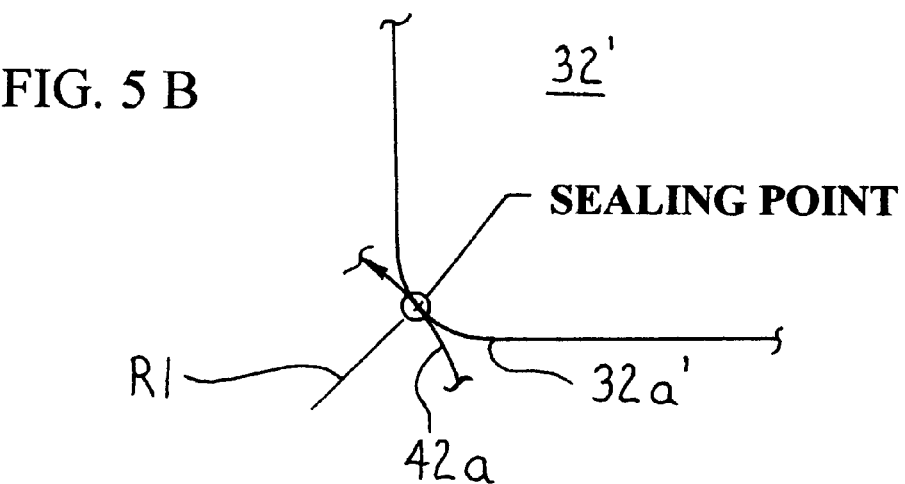

FIG. 5B is a schematic diagram of the vent valve 42 like that described above and a radiused valve seat 32' pursuant to an another embodiment of the invention illustrating the sealing relation between the valve and valve seat sealing surfaces 42a, 32a'. The partial spherical valve sealing surface 42a and the radiused valve seat sealing surface 32a' are in circumferential line of contact LOC sealing (shown as a sealing point in FIG. 5B) with the radius of the valve sealing surface having the center C, FIG. 5. In FIG. 5B, the line of contact LOC between the surfaces 42a, 32a' will lie in a horizontal plane that is perpendicular to the plane P of FIG. 5. The vent valve 42 and valve seat 32' function in the manner described above to vent fuel vapor from fuel tank 12.

Figure 3:
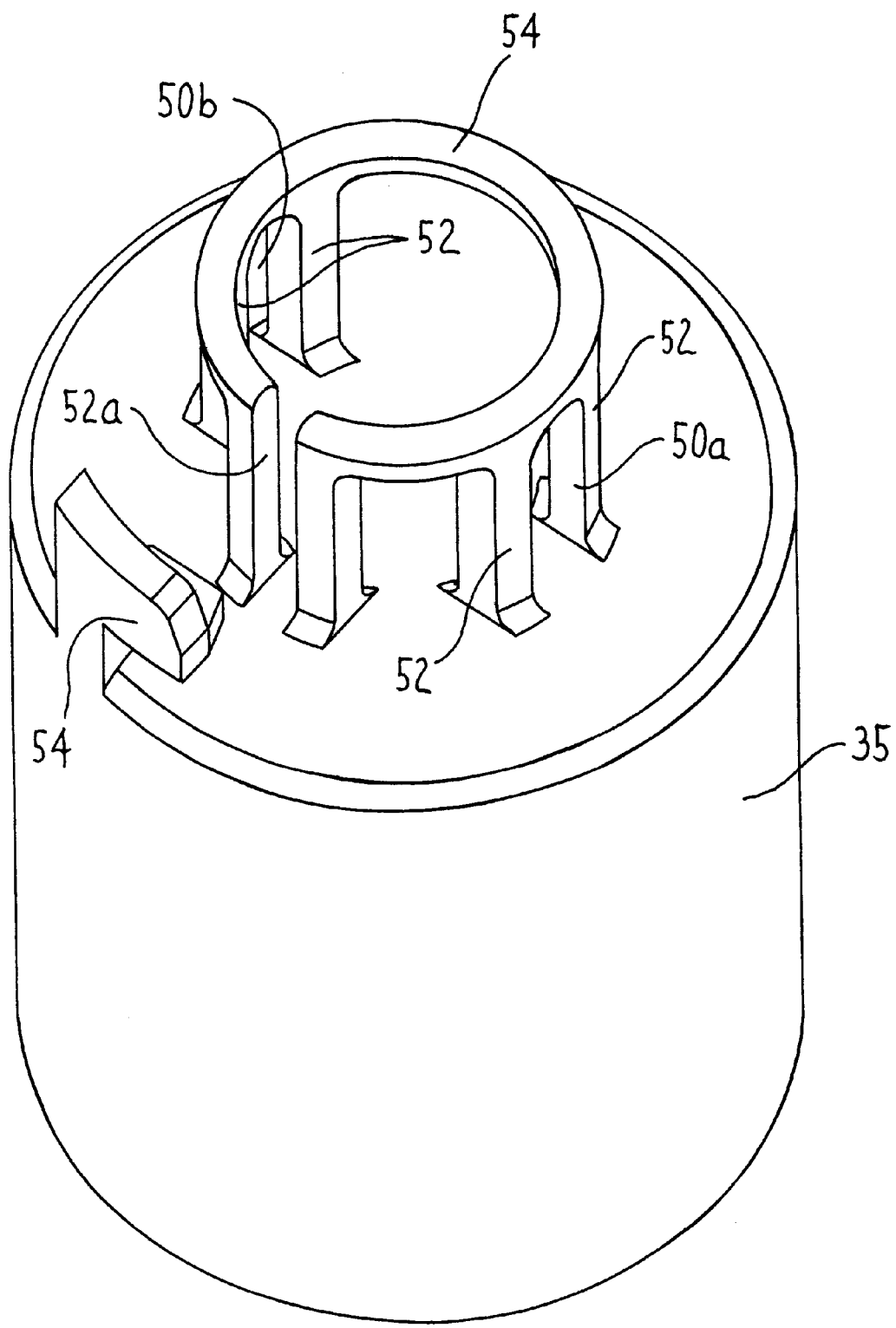
FIG. 3 is a perspective view of the float with a fuel vapor vent valve disposed thereon for rotation about an axis of rotation defined by a valve axle or shaft received for axial movement in upstanding float slots.
Figure 3A:
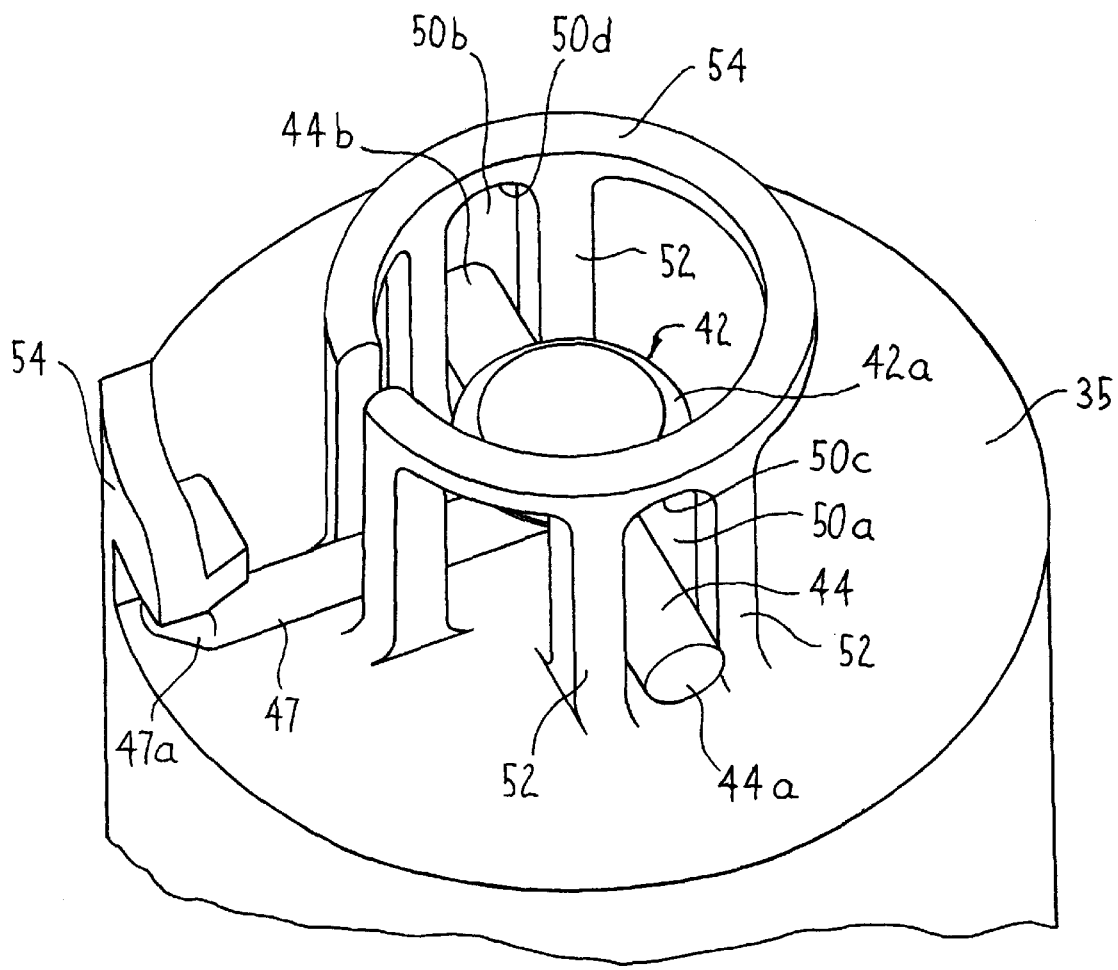
FIG. 3A is an enlarged perspective view of the top of the float with the vent valve on the float.
Figure 4A:
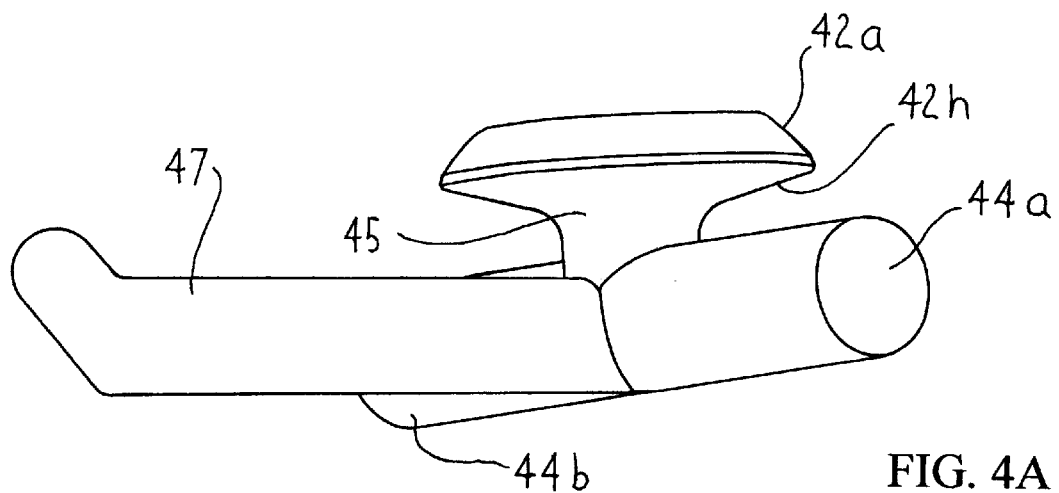
FIGS. 4A and 4B are perspective views of the vent valve.
Figure 4:
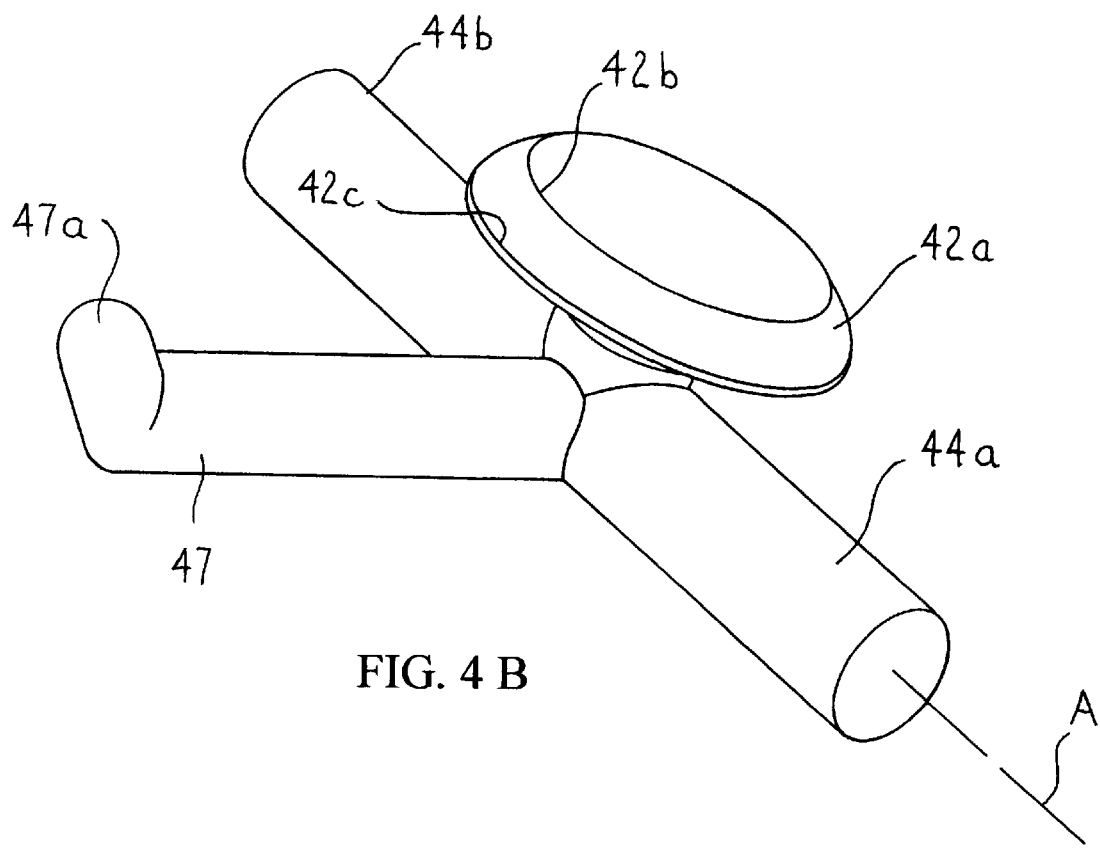

Referring to FIGS. 3 and 3A, the shaft or axle 44 includes ends 44a, 44b that reside in respective slots 50a, 50b extending upwardly from the float 35. The slots 50a, 50b are disposed between upstanding posts 52 interconnected at the top by an arcuate wall 54 and include selected width dimensions that maintain the longitudinal axis A of the axle 44 in proper position relative to the diametral plane P and center C and to apply a downward load or force on the shaft or axle 44 after sealing contact between the valve and valve seat surfaces 42a, 32a (42a, 32a') is broken or interrupted as described below.

Figure 2:
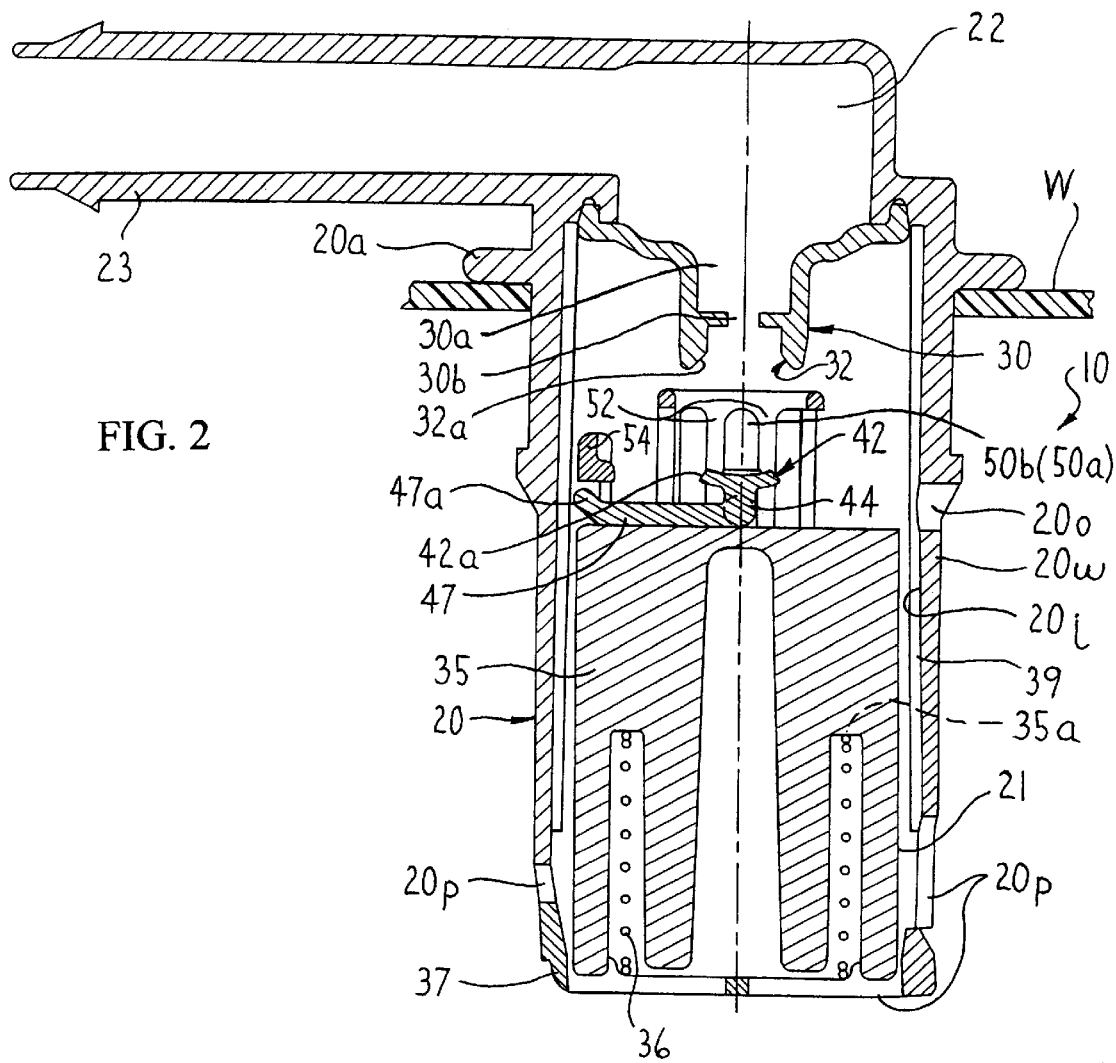
FIG. 2 is a longitudinal sectional view of a fuel vapor vent valve assembly in accordance with an embodiment of the invention disposed in the top wall of the fuel tank.

The vapor vent valve 42 further includes an integrally molded lateral arm 47 that extends radially from the shaft or axle 44 through slot 52a extending upwardly from the float 35 as shown best in FIGS. 2 and 3A as it moves downwardly to initially rotate the vapor vent valve 42 about the axle 44 to break the liquid/vapor tight seal between the valve and valve seat sealing surfaces 42a, 32a (42a, 32a'). The valve arm 47 includes an upturned end 47a to engage the arm 54 of the float 35. The float arm 54 comprises a generally inverted L-shape and typically is molded integrally on the float 35 with the other float features described.

The vent valve 42 preferably comprises a molded plastic fuel resistant material described above or any other suitable material. The valve head 42h, sealing surface 42a, axle 44, neck, 45, and arm 47 can be integrally molded from such plastic material.

In operation, when the float 35 is positioned in the housing 20 in its downward position by virtue of a low fuel level in the tank 12, the vent seat 32 is open to vent fuel vapors from the fuel tank 12 through vent opening 22. The vent valve 42 will reside on the top surface of the float 35, FIG. 2, with the valve arm 47 parallel to the top of the float. As the float travels in an upward direction in the presence of liquid fuel (or during rollover), the partial spherical sealing surface 42a of the valve 42 will eventually mate with the sealing surface 32a (32a') of the valve seat 32 (32'). The mating relationship effects a circumferential line of contact liquid/vapor tight seal therebetween to close off the vent opening 22 and prevent flow of fuel vapor or liquid fuel to canister 14.

As the float 35 travels in the downward direction after the sealing surfaces 42a, 32a have been in sealing relation, the effective weight of the float 35 will be transmitted through the L-shaped arm 54 of the float as a downward load or force on the upturned end 47a of the valve arm 47 extending radially from the valve axle 44. The downward load will cause the vent valve 42 to rotate about axis A of the axle 44 and center C so that valve sealing surface 42a rotates relative to the seat sealing surface 32a (32a'), the slots 50a, 50b of the float maintaining the axle 44 in proper position as described above. Rotation of the vent valve 42 will occur once the load on the arm 47 provides sufficient moment to overcome the static friction of the circumferential line of contact LOC between the valve and valve seat sealing surfaces 42a, 32a (32a'). The magnitude of the static friction is directly related to the vapor pressure level in the fuel tank. As tank vapor pressure increases, the load on the valve arm 47 must increase to achieve rotation of the vent valve 42.

Once static friction is overcome, rotation of the vent valve 42 will occur with less load on the arm 47 because the force required to overcome dynamic friction is less than that needed to overcome static friction.

As the vent valve 42 rotates in valve seat 32, vapor flow passage 55, 55a, FIG. 5, is created between the valve and valve seat surfaces 42a, 32a (32a') and lowers the tank vapor pressure and thus reduces the pressure differential across the vent valve 42, reducing the downward load required to axially pull the valve 42 from the seat 32. The configuration of the vapor flow passage will depend on the particular configuration of vent valve 42 and valve seat 32.

Once the vent valve 42 has rotated a small number of degrees dependent on valve geometry, the weight of the float 35 will be transmitted as a downward load to the valve axle 44 by the upper end wall 50c, 50d of the slots 50a, 50b of the float. The weight of the float will be selected sufficient to axially pull the vent valve 42 from the seat 32, thus reopening the vent opening 22 to allow fuel vapor flow to the canister 14.

The present invention is advantageous to provide a vapor vent valve assembly for a vehicle fuel tank that overcomes the problem of valve reopening that can occur during high static fuel level and dynamic fuel sloshing conditions, especially when the problem of valve reopening is exacerbated by the need for a large vapor vent orifice and by limited packaging envelop/space constraints on the fuel vapor vent valve assembly.

We claim:

1. A fuel vapor vent valve assembly for a vehicle fuel tank for venting fuel vapor from the fuel tank to a fuel vapor emission device disposed external of the fuel tank, said assembly comprising:

valve housing having a fuel vapor vent opening communicating with the interior of said fuel tank and with said fuel vapor emission device, a valve seat being associated with said opening, a fuel level responsive valve-moving device disposed in said housing for movement in response to level of fuel, and a fuel vapor vent valve for closing and opening relative to said valve seat to control fuel vapor flow through said vent opening in response to movement of said valve-moving device, said vent valve including a partial spherical, radius-defined sealing surface that mates with a sealing surface of said valve seat to provide liquid/vapor tight sealing relation therebetween when said valve is in the closed position relative to said valve seat, said vent valve having an axle with an axis substantially intersecting a center of the radius of said valve sealing surface and about which said valve is rotated in said valve seat so as to rotate said valve sealing surface relative to said valve seat sealing surface in response to downward movement of said valve-moving device when said valve and valve seat surfaces are in said sealing relation, said valve sealing surface being configured such that rotation of said valve relative to said valve seat interrupts said sealing relation and provides a vapor flow path that reduces the pressure differential across said valve to facilitate its reopening by further downward movement of said valve-moving device.

2. The assembly of claim 1 wherein said fuel level responsive valve-moving device comprises a float.

3. The assembly of claim 1 wherein said valve sealing surface comprises an annular, partial spherical surface about a circumference thereof and said axle is spaced from said sealing surface.

4. The assembly of claim 3 wherein said valve sealing surface is bounded by upper and lower circular lips.

5. The assembly of claim 1 wherein said axis resides substantially in a diametral plane defining said partial spherical sealing surface.

6. The assembly of claim 5 wherein said axle includes ends that reside in respective upwardly extending slots of said valve-moving device, said slots having selected width dimensions that maintain said axis of said axle in position substantially intersecting said center.

7. The assembly of claim 6 wherein upper walls of said slots apply a downward force on said axle after said sealing relation between said valve and valve seat surfaces is interrupted.

8. The assembly of claim 5 wherein said vent valve further includes an arm that extends radially from said axle and is engaged by an overlying arm of said valve-moving device as it moves downwardly to initially rotate the vapor vent valve about said axle to interrupt said sealing relation between said valve and valve seat surfaces.

9. A fuel vapor vent valve assembly for a vehicle fuel tank for venting fuel vapor from the fuel tank to a fuel vapor emission device disposed external of the fuel tank, said assembly comprising:

a valve housing having a fuel vapor vent opening communicating with the interior of said fuel tank and with said fuel vapor emission device, a valve seat being associated with said vent opening, a fuel level responsive float disposed in said housing for movement therein in response to level of fuel, and a fuel vapor vent valve for closing and opening relative to said valve seat to control fuel vapor flow through said vent opening in response to movement of said float, said vent valve including a partial spherical sealing surface that mates with a sealing surface of said valve seat to provide line of contact liquid/vapor tight sealing relation therebetween when said valve is in the closed position relative to said valve seat, said valve sealing surface being defined by a radius dimension having a center, said vent valve having an axle whose longitudinal axis substantially intersects said center and about which said valve is rotated in said valve seat in response to initial downward movement of said valve-moving device when said valve and valve seat surfaces are in said sealing relation so as to rotate said valve sealing surface relative to said valve seat sealing surface, said valve sealing surface being configured such that rotation of said valve in said valve seat interrupts said sealing relation and provides a vapor flow path that reduces the pressure differential across said valve to facilitate its reopening by further downward movement of said float.

10. The assembly of claim 9 wherein said valve sealing surface comprises an annular, partial spherical surface about a circumference thereof and said axle is spaced from said sealing surface.

11. The assembly of claim 10 wherein said valve sealing surface is bounded at an upper and lower circular lips.

12. The assembly of claim 9 wherein said axle includes a longitudinal axis that resides substantially in a diametral plane defining said partial spherical valve surface and that intersects said center below said valve surface.

13. The assembly of claim 12 wherein said axle includes ends that reside in respective upwardly extending slots of said float, said slots having selected width dimensions that maintain said longitudinal axis of said axle in position substantially intersecting said common center.

14. The assembly of claim 13 wherein upper walls of said slots apply a downward force on said axle after said sealing relation between said valve and valve seat surfaces is interrupted.

15. The assembly of claim 12 wherein said vent valve further includes an arm that extends radially from said axle and is engaged by an overlying arm of said float as it moves downwardly to initially rotate the vapor vent valve about said axle to interrupt said sealing relation between said valve and valve seat surfaces.

* * * * *